(No Model.)

L. GIBBS.
PLOW CLEVIS AND LINK.

No. 326,210. Patented Sept. 15, 1885.

WITNESSES:
Harry Frease
Chas. R. Miller

INVENTOR
Lewis Gibbs
BY
W. K. Miller
ATTORNEY

UNITED STATES PATENT OFFICE.

LEWIS GIBBS, OF CANTON, OHIO.

PLOW-CLEVIS AND LINK.

SPECIFICATION forming part of Letters Patent No. 326,210, dated September 15, 1885.

Application filed April 18, 1885. (No model.)

*To all whom it may concern:*

Be it known that I, LEWIS GIBBS, a citizen of the United States, and a resident of Canton, county of Stark, State of Ohio, have invented a new and useful Improvement in Plow-Clevises and Links, of which the following is a full, clear, and exact description, reference being had to the accompanying drawings, making part of this specification.

My invention relates to an improvement in plow-clevises and links.

The object of my invention is to provide a clevis and link by which a double-tree may be attached to a plow-beam, so that during the progressive movement of the plow it will not be diverted from its course by the elevation or depression of either end of the double-tree, and that will so pivot the plow in the line of its draft as to free it from the influence of an unbalanced double-tree or triple-tree, and also from being diverted from its course by the uneven or irregular movement of the team, and thereby causing it to run and handle more easily.

Figure 2:
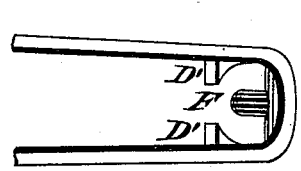
Figure 3:
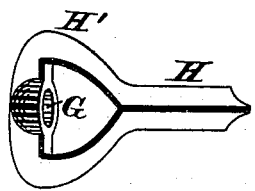
Figure 1:
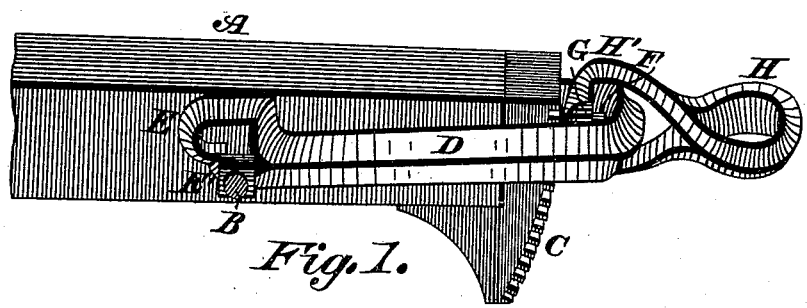
Figure 4:
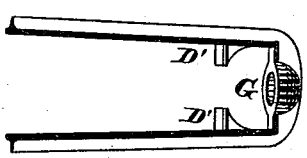
Figure 5:
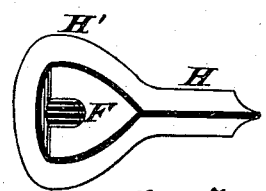

In the drawings, Figure 1 is a side view of a plow-beam having my improved clevis and link attached. Fig. 2 is a separate view of the clevis. Fig. 3 is a view of the draft-link; and Figs. 4 and 5 are separate views of the clevis and link, showing a transposition of parts, which will be hereinafter explained.

A is a plow-beam. B is a draft-bolt. C is a toothed segment on the end of the plow-beam. D is a draft-loop, having detents D' D' projecting from the opposite sides of the loop and engaging with the teeth of the segment. E E' is an L-shaped slot at the rear ends of the straps which form the loop.

The operation of the device is as follows: If the nut on the draft-bolt B is loosened and the strap pressed down until the draft-bolt enters the horizontal portion of the L-shaped slot, this will permit the strap to pass sufficiently far forward to release the detents D' D' from the toothed segment and permit the clevis-loop to be raised or lowered. When at the proper height, the strap is pushed back so as to engage with the segment. The rear ends of the straps are then forced up, so that the bolt will rest on the lower end of the vertical part of the slot. The nut is then tightened and the structure is rigid.

On the inside of the draft-loop, and near the center of the head, there is a pin or pivot, F. (Shown in Fig. 1, but more clearly in Fig. 2.) This pivot projects backward in the line of the draft a distance of about one inch, and in the rear lobe of the draft-link H there is a sphere-shaped cup, G. (Shown in Fig. 1, but more clearly in Fig. 3.) The bottom of this cup bears on the end of the pin F. The inside of the cup G is more conical in form than the pin F, so as to allow the bottom of the cup to conform to the end of the pivot, but the side of the cup to be so removed or so much larger than the pivot, so as to allow the cup and link to turn freely on the end of the pivot, thus forming a pivoted point in the line of draft.

In Figs. 4 and 5 is shown a transposition of the parts of my invention. The pivot F is taken from the loop D and placed in the rear lobe, H, of the looped draft-link, and the sphere-shaped cup takes the place of the pivot in the loop D. While I prefer the arrangement of the parts as seen in Figs. 2 and 3, about the same results may be obtained by a transposition of the parts, as shown in Figs. 4 and 5.

The ordinary clevis is passed through the front lobe of the draw-link, and is attached to the double-tree in the usual way.

Having thus fully described the nature, construction, and operation of my invention, what I desire to secure by Letters Patent is—

1. The combination of a loop and link, one of said parts being provided with an inwardly-projecting lug and the other part with a recessed seat for the reception of said lug.

2. The combination, with a toothed segment and a draft-loop having detents and an inwardly-projecting lug, of a link having a recessed seat for the reception of said lug, substantially as set forth.

3. The combination, with a plow-beam, a draft-loop having an inwardly-projecting bearing, and devices, substantially as described, for locking the loop in position, of the link aving a cup-shaped depression, substantially as set forth.

4. The combination of a draft loop and link, respectively provided with a projecting lug and recess, whereby the pivotal or contact point between the link and loop is in the rear of a line describing the inside of the front end of the draft-loop.

In testimony whereof I have hereunto set my hand this 15th day of April, A. D. 1885.

LEWIS GIBBS.

Witnesses:
CHAS. R. MILLER,
H. R. SPENCER.